United States Patent
Tseng et al.

(10) Patent No.: US 9,595,397 B2
(45) Date of Patent: Mar. 14, 2017

(54) HIGH ENERGY DENSITY ASYMMETRIC PSEUDOCAPACITOR AND METHOD OF MAKING THE SAME

(71) Applicant: National Chiao Tung University, Hsinchu (TW)

(72) Inventors: Tseung-Yuen Tseng, Hsinchu (TW); Chung-Jung Hung, Tainan (TW); Pang Lin, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 102 days.

(21) Appl. No.: 14/486,298

(22) Filed: Sep. 15, 2014

(65) Prior Publication Data

US 2015/0302999 A1 Oct. 22, 2015

(30) Foreign Application Priority Data

Apr. 21, 2014 (TW) .............. 103114371 A

(51) Int. Cl.
*H01G 11/04* (2013.01)
*H01G 11/36* (2013.01)
(Continued)

(52) U.S. Cl.
CPC ............ *H01G 11/36* (2013.01); *H01G 11/04* (2013.01); *H01G 11/46* (2013.01); *H01G 11/86* (2013.01); *H01G 11/68* (2013.01); *Y02E 60/13* (2013.01)

(58) Field of Classification Search
CPC ........ H01G 11/28; H01G 11/34; H01G 11/40; H01G 11/42
(Continued)

(56) References Cited

U.S. PATENT DOCUMENTS

| 8,611,070 B2 | 12/2013 | Ivanovici et al. |
| 2007/0076349 A1* | 4/2007 | Dementiev ............ H01G 9/038 361/502 |

(Continued)

FOREIGN PATENT DOCUMENTS

| CN | 102683037 | 9/2012 |
| CN | 103077834 | 5/2013 |

(Continued)

OTHER PUBLICATIONS

Y. Shao et.al., "High-Performance Flexible Asymmetric Supercapacitors Based on 3D Porous Graphene/MnO2 Nanorod and Graphene/Ag Hybrid Thin-Film Electrodes," Journal of Materials Chemistry C, 1, 1245-1251 (2013).

(Continued)

*Primary Examiner* — Nguyen Ha
(74) *Attorney, Agent, or Firm* — Akerman LLP; Peter A. Chiabotti

(57) ABSTRACT

A high energy density asymmetric pseudocapacitor includes a cathode plate, an anode plate, and a separator. The cathode plate includes a first conductive substrate and a porous cathode film formed on the first conductive substrate. The porous cathode film includes a carbon nano-tube network and a plurality of composite flakes. Each of the composite flakes contains graphene, a transition metal compound and carbon nano-tubes. The anode plate includes a second conductive substrate and an anode film formed on the second conductive substrate. The anode film contains graphene and carbon nano-tubes.

5 Claims, 6 Drawing Sheets

(51) Int. Cl.
*H01G 11/46* (2013.01)
*H01G 11/86* (2013.01)
*H01G 11/68* (2013.01)

(58) Field of Classification Search
USPC ........ 361/502, 503–504, 512, 523–525, 528, 361/529
See application file for complete search history.

(56) References Cited

U.S. PATENT DOCUMENTS

| | | | | |
|---|---|---|---|---|
| 2012/0026643 | A1* | 2/2012 | Yu | H01G 11/02 361/502 |
| 2012/0050953 | A1* | 3/2012 | Lee | H01G 11/06 361/528 |
| 2013/0045427 | A1* | 2/2013 | Zhamu | H01M 4/38 429/403 |
| 2013/0050903 | A1* | 2/2013 | Kim | H01G 11/32 361/502 |
| 2013/0100582 | A1* | 4/2013 | Jung | H01G 11/32 361/502 |
| 2013/0271085 | A1* | 10/2013 | Chen | H01M 4/0445 320/132 |

FOREIGN PATENT DOCUMENTS

| | | |
|---|---|---|
| TW | 201206712 | 2/2012 |
| TW | 201328001 | 7/2013 |

OTHER PUBLICATIONS

H. Gao et.al., "High-Performance Asymmetric Supercapacitor Based on Graphene Hydrogel and Nanostructured MnO2," ACS Applied Materials & Interfaces, 4, 2801-2810 (2012).
Z. Fan et.al., "Asymmetric Supercapacitors Based on Graphene MnO2 and Activated Carbon Nanofiber Electrodes with High Power and Energy Density," Adv. Functional Materials, 21, 2366-2375 (2011).
X. Zhao et.al., "Incorporation of Manganese Dioxide within Ultraporous Activated Graphene for High-Performance Electrochemical Capacitors," ACS Nano, vol. 6, No. 6, 5404-5412 (2012).
J. Shen et.al., "Asymmetric Deposition of Manganese Oxide in Single Walled Carbon Nanotube Films as Electrodes for Flexible High Frequency Response Electrochemical Capacitors," Electrochimica Acta, 78, 122-132 (2012).
Y. Cheng et.al., "Flexible Asymmetric Supercapacitors with High Energy and High Power Density in Aqueous Electrolytes," Nanoscale, 5, 1067-1073 (2013).

* cited by examiner

HIGH ENERGY DENSITY ASYMMETRIC PSEUDOCAPACITOR AND METHOD OF MAKING THE SAME

CROSS-REFERENCE TO RELATED APPLICATION

This application claims priority of Taiwanese Patent Application No. 103114371, filed on Apr. 21, 2014.

FIELD OF THE INVENTION

This invention relates to a high energy density asymmetric pseudocapacitor and a method of making the same, more particularly to a high energy density asymmetric pseudocapacitor including a cathode film that contains a carbon nano-tube network and a plurality of composite flakes.

BACKGROUND OF THE INVENTION

Electrochemical capacitors are characterized as having advantages, such as the abilities to provide high power and high energy, to charge and discharge speedily, and to achieve a high capacity for electrical energy storage.

An asymmetric pseudocapacitor is one type of the electrochemical capacitors, and stores electrical energy by charging an interface between an electrode of the asymmetric pseudocapacitor and an electrolyte through Faradaic reaction.

FIG. 1 illustrates a conventional asymmetric pseudocapacitor that includes an anode plate 11, a cathode plate 12, and a separator 13 disposed between the anode plate 11 and the cathode plate 12.

The anode plate 11 includes a first conductive substrate 111, an anode thin film 112 disposed on the conductive substrate 111, and a first adhesive 113 disposed between the first conductive substrate 111 and the anode thin film 112 to adhere the anode thin film 112 to the first conductive substrate 111.

The cathode plate 12 includes a second conductive substrate 121, a cathode thin film 122, and a second adhesive 123 disposed between the second conductive substrate 121 and the cathode thin film 122 to adhere the cathode thin film 122 to the second conductive substrate 121.

The method of making the conventional asymmetric pseudocapacitor is described below:

(a) adhering the anode thin film 112 to the first conductive substrate 111 through the first adhesive 113 to form the anode plate 11;

(b) adhering the cathode thin film 122 to the second conductive substrate 121 through the second adhesive 123 to form the cathode plate 12; and (c) disposing the separator 13 between the anode thin film 112 and the cathode thin film 122.

Since the first and second adhesives 113, 123 are non-conductive, charge-transfer resistances of the cathode plate 12 and the anode plate 11 may undesirably increase, thereby adversely affecting the performance and efficiency of the conventional asymmetric pseudocapacitor.

In order to solve the above-mentioned problem, one solution was proposed to form the anode thin film and the cathode thin film directly and respectively onto the substrates by electrophoretic deposition, so that the aforesaid first and second adhesives 113, 123 can be omitted. In addition, in order to increase electrophoretic mobility of an electrolyte, a surfactant is normally added in the electrolyte. After the formation of the anode and cathode thin films, the electrolyte is removed by evaporation. However, the surfactant cannot be removed along with the electrolyte by evaporation and remains on the anode and cathode thin films, which results in an increase in the charge-transfer resistances of the anode plate and the cathode plate.

SUMMARY OF THE INVENTION

Therefore, the object of the present invention is to provide a high energy density asymmetric pseudocapacitor with a porous cathode film that can overcome at least one of the aforesaid drawbacks associated with the prior art.

According to one aspect of this invention, there is provided a high energy density asymmetric pseudocapacitor that comprises: a cathode plate including a first conductive substrate and a porous cathode film that is formed on the first conductive substrate, the porous cathode film including a carbon nano-tube network and a plurality of composite flakes dispersed in the carbon nano-tube network, each of the composite flakes containing graphene, a transition metal compound, and carbon nano-tubes; an anode plate including a second conductive substrate and an anode film that is formed on the second conductive substrate, the anode film containing graphene and carbon nano-tubes; and a separator disposed between the anode plate and the cathode plate.

According to another aspect of this invention, there is provided a method of making a high energy density asymmetric pseudocapacitor. The method comprises: (a) dispersing a first composite powder and a carbon nano-tube powder in a first solvent to form a first solution, the first composite powder containing graphene, a transition metal oxide and carbon nano-tubes; (b) disposing a first conductive substrate in the first solution to deposit a porous cathode film on the first conductive substrate through electrophoresis; (c) dispersing a graphene powder and a carbon nano-tube powder in a second solvent to form a second solution; (d) disposing a second conductive substrate in the second solution to deposit an anode film on the second conductive substrate through electrophoresis; and (e) disposing a separator between the anode film and the porous cathode film.

BRIEF DESCRIPTION OF THE DRAWINGS

In drawings which illustrate an exemplary embodiment of the invention.

DETAILED DESCRIPTION OF THE EXEMPLARY EMBODIMENT

Figure 1:
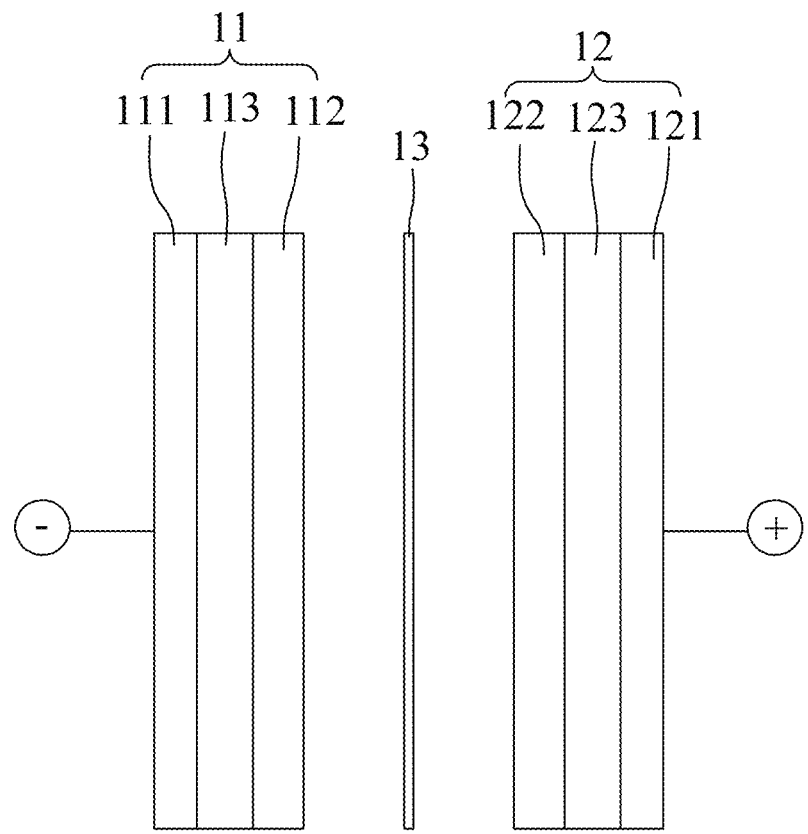
FIG. 1 is a schematic view of a conventional asymmetric pseudocapacitor.
Figure 2:
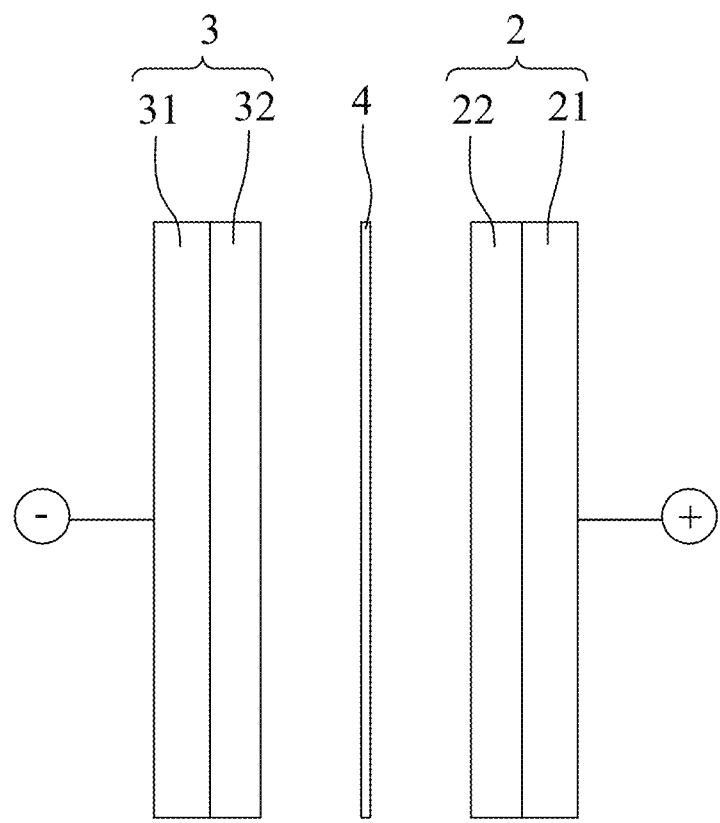
FIG. 2 is a schematic view of the exemplary embodiment of a high energy density asymmetric pseudocapacitor according to the present invention.

FIG. 2 illustrates the exemplary embodiment of a high energy density asymmetric pseudocapacitor according to the present invention. The asymmetric pseudocapacitor includes a cathode plate 2, an anode plate 3, and a separator 4.

The cathode plate 2 includes a first conductive substrate 21, and a porous cathode film 22 that is formed on the first conductive substrate 21.

Figure 3:
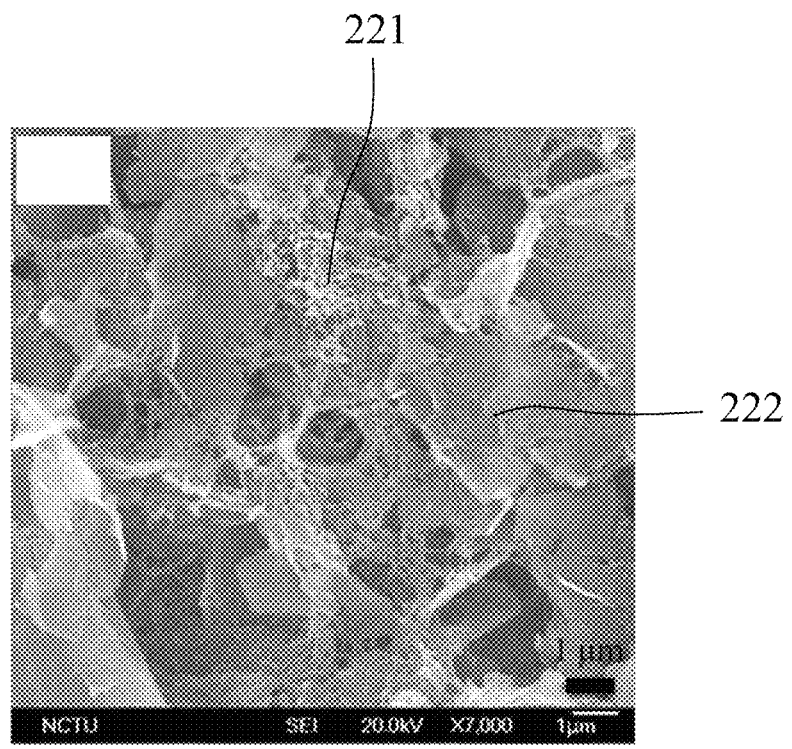
FIG. 3 is a scanning electron microscope (SEM) image of a porous cathode film of the exemplary embodiment.

FIG. 3 shows an SEM (scanning electron microscope) image of the porous cathode film 22. The porous cathode film 22 includes a carbon nano-tube network 221 and a plurality of composite flakes 222 dispersed in the carbon nano-tube network 221. Each of the composite flakes 222 contains graphene, a transition metal compound, and carbon nano-tubes.

The anode plate 3 includes a second conductive substrate 31, an anode film 32 that is formed on the second conductive substrate 31. The anode film 32 contains graphene and carbon nano-tubes.

The separator 4 is disposed between the anode plate 3 and the cathode plate 2.

Preferably, the first conductive substrate 21 of the cathode plate 2 and the second conductive substrate 31 of the anode plate 3 are made from nickel.

The method of making the exemplary embodiment of the high energy density asymmetric pseudocapacitor according to the present invention is described below.

The method includes the step of: (a) dispersing a first composite powder and a carbon nano-tube powder in a first solvent to form a first solution, the first composite powder containing graphene, a transition metal oxide and carbon nano-tubes; (b) disposing a first conductive substrate 21 in the first solution to deposit a porous cathode film 22 on the first conductive substrate 21 through electrophoresis, followed by removing the first solvent from the porous cathode film 22; (c) dispersing a graphene powder and a carbon nano-tube powder in a second solvent to form a second solution; (d) disposing a second conductive substrate 31 in the second solution to deposit an anode film 32 on the second conductive substrate 31 through electrophoresis, followed by removing the second solvent from the anode film 32; and (e) disposing a separator 4 between the anode film 32 and the porous cathode film 22. Each of the first and second solvents serves as an electrolyte during the electrophoretic deposition.

The graphene employed in step (a) and the graphene powder employed in step (c) are prepared by oxidizing a graphite powder to form a graphene oxide powder and reducing the graphene oxide powder to form a graphene powder using a sodium hydroxide solution as a reducing agent.

Preferably, the transition metal oxide is manganese dioxide. Each of the first solvent and the second solvent contains hydrochloric acid and isopropanol for providing hydrogen ions during the electrophoretic deposition.

The high energy density asymmetric pseudocapacitor may be encapsulated in a casing which is made from Teflon and which is filled with a capacitor electrolyte made from sodium sulphate.

The following example is provided to illustrate the exemplary embodiment of the invention, and should not be construed as limiting the scope of the invention.

Example 1

A graphite powder was subjected to oxidation to form a graphene oxide powder using a Hummers process. 100 g of the graphene oxide powder was then dispersed in 50 ml deionized water through ultrasonication to form a brown solution.

A sodium hydroxide solution having a pH value of 14 was mixed with the brown solution at a temperature of 95° C. for 30 minutes to form a reduced graphene, followed by drying at a temperature of 110° C. The reduced graphene was then annealed at a temperature of 750° C. in a gas containing hydrogen and argon to form a graphene powder.

0.54 g of the graphene powder and 0.06 g carbon nano-tubes were mixed in the de-ionic (DI) water (50 mL) and were dispersed by ultrasonic agitation for 30 min. Then, 30 ml of 0.005 M $KMnO_4$ aqueous solution was added into the homogeneous graphene powder/carbon nano-tubes dispersion drop by drop at room temperature, followed by stirring for 6 hours until a purple color of the dispersion was disappeared. Finally, the first composite powder was obtained via filtering the solution. The first composite powder was then rinsed with DI water and was dried in an oven at 110° C. for 12 hours.

0.095 g of the first composite powder, 0.05 g of a carbon nano-tube powder, and 0.2 ml of 37 wt % hydrochloric acid were mixed with 80 ml isopropanol, followed by ultrasonication to form a first solution.

A nickel plate and a platinum plate, which respectively serve as an electrophoresis cathode and an electrophoresis anode, were placed at a distance of 1 cm in the first solution to perform electrophoretic deposition of a porous cathode film on the nickel plate. The electrophoretic deposition was conducted for 2 minutes under a 50 V DC voltage.

The formed porous cathode film along with the nickel plate was dried in an oven at a temperature of 120° C. for 12 hours to obtain the cathode plate. The weight of the porous cathode film was 0.55 mg.

0.05 g of a carbon nano-tube powder and 0.2 ml of 37 wt % hydrochloric acid were added into 80 ml isopropanol with 0.05 g of graphene, followed by ultrasonication to form a second solution.

A nickel plate and a platinum plate, which respectively serve as an electrophoresis cathode and an electrophoresis anode, were placed at a distance of 1 cm in the second solution to perform electrophoretic deposition of an anode film on the nickel plate. The electrophoretic deposition was conducted for 2 minutes under a 50V DC voltage.

The formed anode film along with the nickel plate was dried in an oven at a temperature of 120° C. for 12 hours to form the anode plate. The weight of the anode film was 2.7 mg.

A separator (DuPont™ Nafion® NRE211 membrane) was disposed between the anode plate and the cathode plate to form the asymmetric pseudocapacitor of Example 1.

Figure 4:
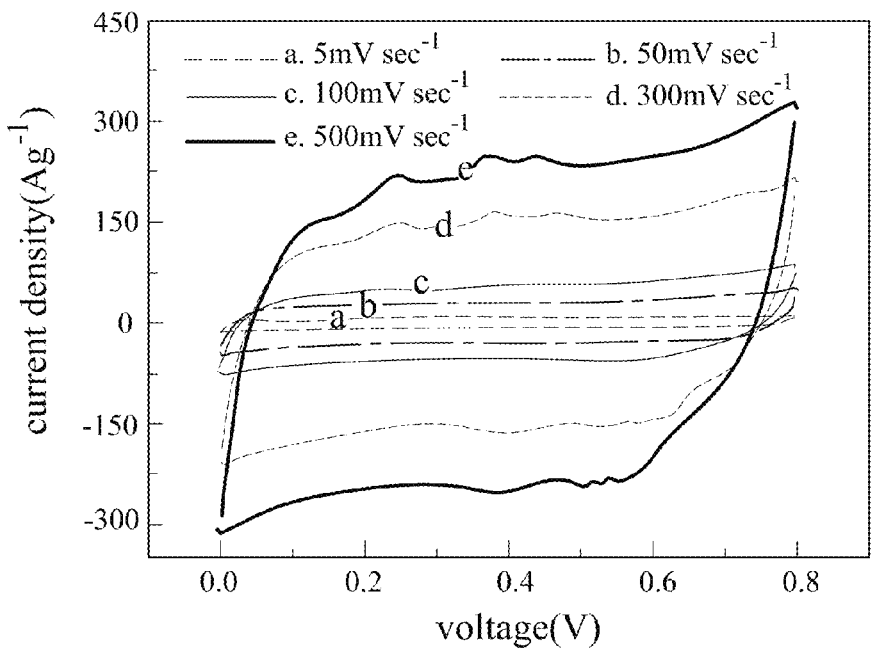
FIG. 4 is a plot of a current density vs. voltage for a cathode plate of an encapsulated asymmetric pseudocapacitor of Example 1.

FIG. 4 is a C-V (Current density-Voltage) plot for the cathode plate of Example 1 under different scan rates. The measurement of C-V curves of the cathode plate of Example 1 was conducted using a three-electrode cell system for evaluating the electrochemical behavior of an internal half cell of the cathode plate. The three-electrode cell system includes the cathode plate serving as a working electrode, a platinum metal plate serving as an auxiliary electrode, a calomel electrode serving as a reference electrode, and an electrolyte of sodium sulfate which has a concentration of 0.1 M. FIG. 4 shows that the C-V curves appear to be a near-ideal symmetric rectangular profile under a scan rate ranging from 5 $mVs^{-1}$ to 500 $mVs^{-1}$.

Figure 5:
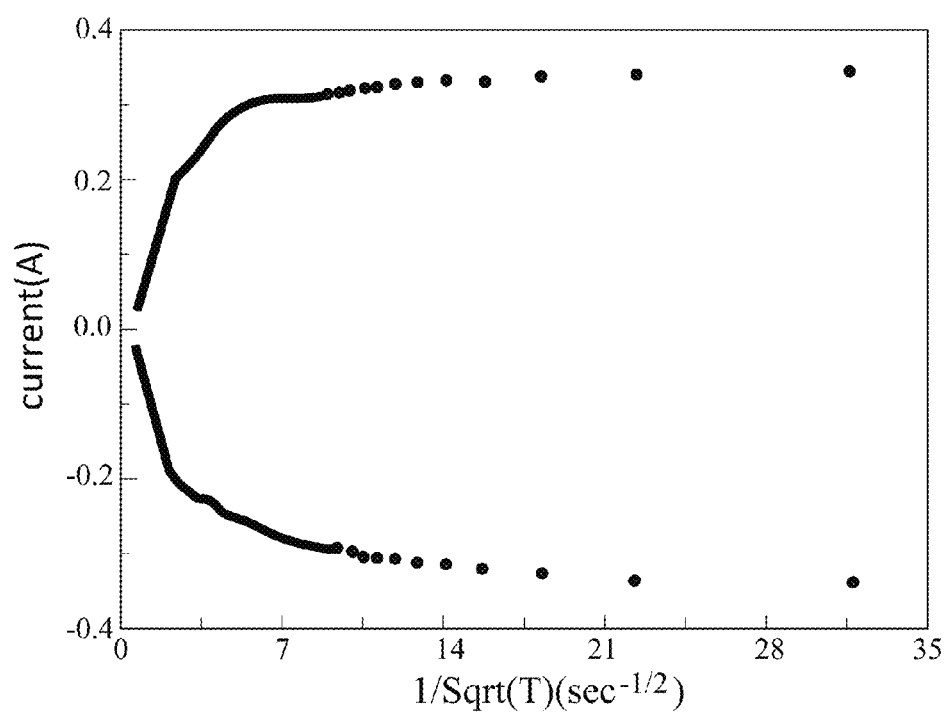
FIG. 5 is a plot of a current vs. inverse ratio of the square root of a measurement time for the cathode plate of the encapsulated asymmetric pseudocapacitor of Example 1.

FIG. 5 is a plot of Cottrell current (i) vs. inverse ratio of the square root of time ($1/t^{1/2}$) for measuring diffusion coefficients for intercalation and deintercalation of sodium ions on the cathode plate of Example 1. The measured Cottrell current can be used to calculate the diffusion coefficients for intercalation and deintercalation based on Cottrell equation. The measurement was conducted using 0.1M sodium sulfate solution. The diffusion coefficients for intercalation and deintercalation of the sodium ions on the cathode plate are $6.34\times10^{-7}$ $cm^2s^{-1}$ and $8.86\times10$ $cm^2s^{-1}$, respectively.

Figure 6:
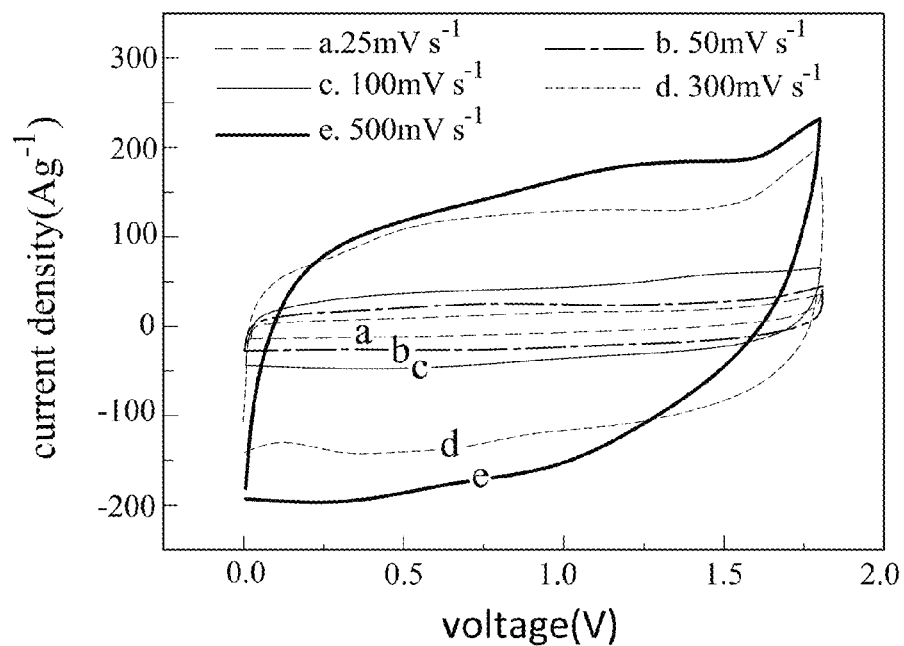
FIG. 6 is a plot of a current density vs. voltage for the encapsulated asymmetric pseudocapacitor of Example 1.

FIG. 6 is a C-V plot of current density vs. voltage under different scan rates for the asymmetric pseudocapacitor of Example 1. The asymmetric pseudocapacitor of Example 1 was encapsulated in a casing which was made from Teflon and which was filled with an electrolyte of 0.1 M sodium sulfate. FIG. 6 shows that the C-V curves appear to be a near-ideal symmetric rectangular profile under a scan rate ranging from 25 $mVs^{-1}$ to 500 $mVs^{-1}$.

Figure 7:
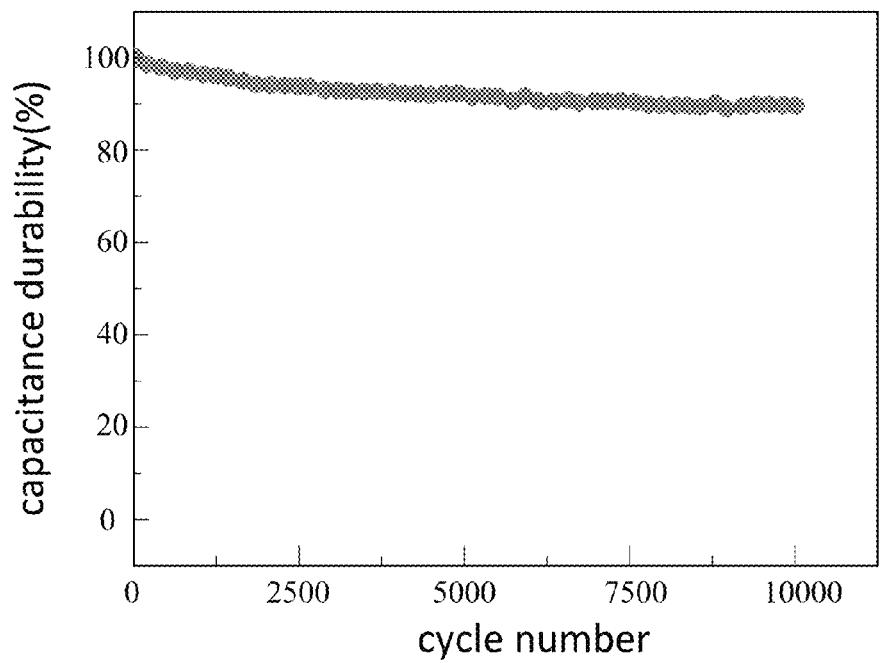
FIG. 7 is a plot of capacitance durability vs. charge/discharge cycle number for the encapsulated asymmetric pseudocapacitor of Example 1.

FIG. 7 is a plot of capacitance durability (durability=C/$C_o\times100\%$, where $C_o$ is the initial capacitance and C is the capacitance after a predetermined number of charge/discharge cycles) vs. number of charge/discharge cycles for the asymmetric pseudocapacitor of Example 1. FIG. 7 shows that the capacity durability maintains at about 89% after 10000 charge/discharge cycles for the asymmetric pseudocapacitor of Example 1.

Figure 8:
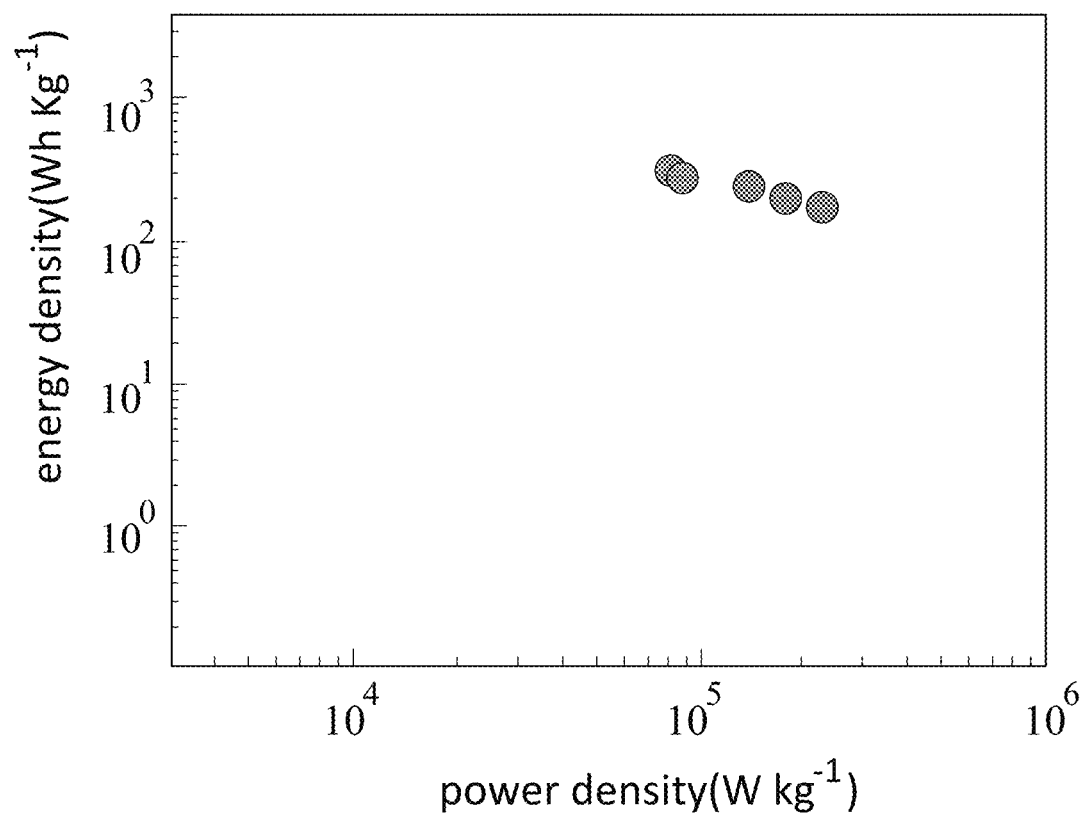
FIG. 8 is a plot of an energy density vs. a power density for the encapsulated asymmetric pseudocapacitor of Example 1.

FIG. 8 is a plot of energy density vs. power density for the asymmetric pseudocapacitor of Example 1. FIG. 8 shows that the asymmetric pseudocapacitor of Example 1 has an energy density of about 304.1 $Whkg^{-1}$ and a power density of about 83.8 $kWkg^{-1}$ under a current density of 0.55 $Ag^{-1}$ at an operation voltage of 1.8 V, and has an energy density of about 171.2 $Whkg^{-1}$ and a power density of about 226.5 $kWkg^{-1}$ under a current density of 6.5 $Ag^{-1}$.

With the inclusion of the porous cathode film in the high energy density asymmetric pseudocapacitor of the present invention, the aforesaid drawbacks associated with the prior art can be alleviated.

While the present invention has been described in connection with what are considered the most practical embodiment, it is understood that this invention is not limited to the disclosed embodiments but is intended to cover various arrangements included within the spirit and scope of the broadest interpretation and equivalent arrangements.

What is claimed is:

1. A method of making a high energy density asymmetric pseudocapacitor, comprising:
   (a) dispersing a first composite powder and a carbon nano-tube powder in a first solvent to form a first solution, the first composite powder containing graphene, a transition metal oxide and carbon nano-tubes;
   (b) disposing a first conductive substrate in the first solution to deposit a porous cathode film on the first conductive substrate through electrophoresis;
   (c) dispersing a graphene powder and a carbon nano-tube powder in a second solvent to form a second solution;
   (d) disposing a second conductive substrate in the second solution to deposit an anode film on the second conductive substrate through electrophoresis; and
   (e) disposing a separator between the anode film and the porous cathode film.

2. The method of claim 1, further comprising oxidizing graphite powder to form a graphene oxide powder and reducing the graphene oxide powder to form a powder of graphene using a sodium hydroxide solution as a reducing agent prior to step (a).

3. The method of claim 1, wherein the first conductive substrate and the second conductive substrate are made from nickel.

4. The method of claim 1, wherein the transition metal oxide is manganese dioxide.

5. The method of claim 1, wherein each of the first solvent and the second solvent contains hydrochloric acid and isopropanol.

* * * * *